Dec. 6, 1960 P. BRADFORD 2,963,284
APPARATUS FOR PRODUCING A FINE SPRAY, FOG OR MIST
Filed Feb. 21, 1957 2 Sheets-Sheet 1

INVENTOR.
PURDY BRADFORD
BY R. G. Story
ATTORNEY

Dec. 6, 1960 P. BRADFORD 2,963,284
APPARATUS FOR PRODUCING A FINE SPRAY, FOG OR MIST
Filed Feb. 21, 1957 2 Sheets-Sheet 2

INVENTOR.
PURDY BRADFORD
BY R. T. Story
ATTORNEY

United States Patent Office 2,963,284
Patented Dec. 6, 1960

2,963,284

APPARATUS FOR PRODUCING A FINE SPRAY, FOG, OR MIST

Purdy Bradford, Palos Park, Ill., assignor to Swift & Company, Chicago, Ill., a corporation of Illinois Filed Feb. 21, 1957, Ser. No. 641,595

1 Claim. (Cl. 261—117)

The present invention relates to apparatus for producing a fine spray, fog, or mist, and is particularly adapted for use in connection with humidification problems.

For many years the meat packing industry has been aware of the shrink that occurs in meat carcasses after they are dressed. Immediately upon killing and dressing the carcasses are put into a refrigerated room to reduce the temperature of the carcass from approximately body heat down to a refrigeration temperature of about 32° F. During this period of time the weight of the carcass will decrease due to loss of moisture approximately 1.25–3 percent. In order to reduce this loss in weight, commonly termed shrink, efforts are made to humidify the refrigerated chambers.

In order to substantially reduce shrinkage of meat chilled in a cooler with an ambient temperature of about 32°, we have found that it is necessary to maintain a total moisture concentration in the air in the cooler amounting to about 45 grains per pound of dry air. This is approximately the moisture content of air having a dew point of 45° F. Obviously, it is not possible for air at 32° F. to carry enough moisture in the vapor phase to provide a dew point of 45° F. Therefore, it is necessary to carry moisture in excess of that required for saturation in the form of a fine fog or mist. This fog or mist preferably is composed of water droplets not substantially in excess of 10 microns in diameter, in order to be effective in reducing shrink. To be the most effective in reducing shrink the water drops should vaporize when the air, in which the water drops are carried, is heated by contact with the carcass or by being in proximity thereto. The larger the drops the more difficult it is for the drops to be so vaporized. I have found the largest desirable size of drops to be about 10 microns. The principal object of the present invention is to provide a method and apparatus for producing such a fog with hydraulic nozzles.

Large water droplets also tend to settle out on rails, hooks, trolleys and the meat itself, thus producing wet and unsanitary conditions in the chill cooler. The use of the small droplets of my invention thus decreases this problem.

One of the principal advantages of the present invention is the simplicity of the apparatus I have devised. Many humidification systems are large, complex, expensive, pieces of apparatus. Often there have to be separate rooms provided to accommodate the apparatus. With the apparatus of my invention the actual humidification may be carried out in the refrigerated chamber without any loss of usable space resulting from the insertion of the humidification apparatus therein. The pump for supplying high pressure water used in the system may be inserted in the refrigerated chamber or in any available space with the water being merely piped to the humidification apparatus from the pump. The humidification apparatus itself may be mounted adjacent the ceiling, well out of the way of any existing equipment. It may be readily fabricated in practically any shape to fit in the available space. The apparatus is low in initial cost and requires little maintenance and operational expense. It is dependable in operation and requires only very occasional inspection to keep it operating properly.

Other objects and advantages will become apparent from the following description taken in conjunction with the drawings in which.

Figure 2:
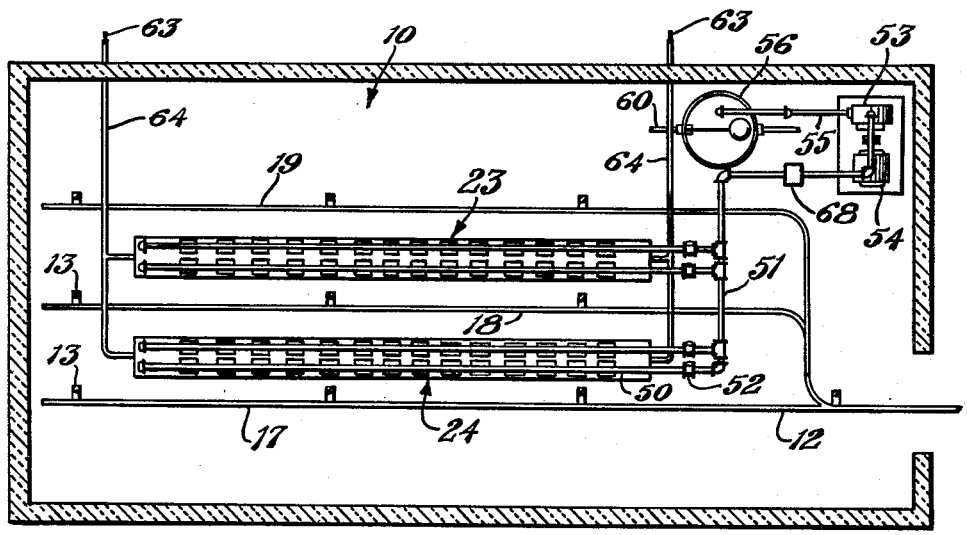
Figure 2 is a plan view in section of the same chamber of Figure 1.
Figure 1:
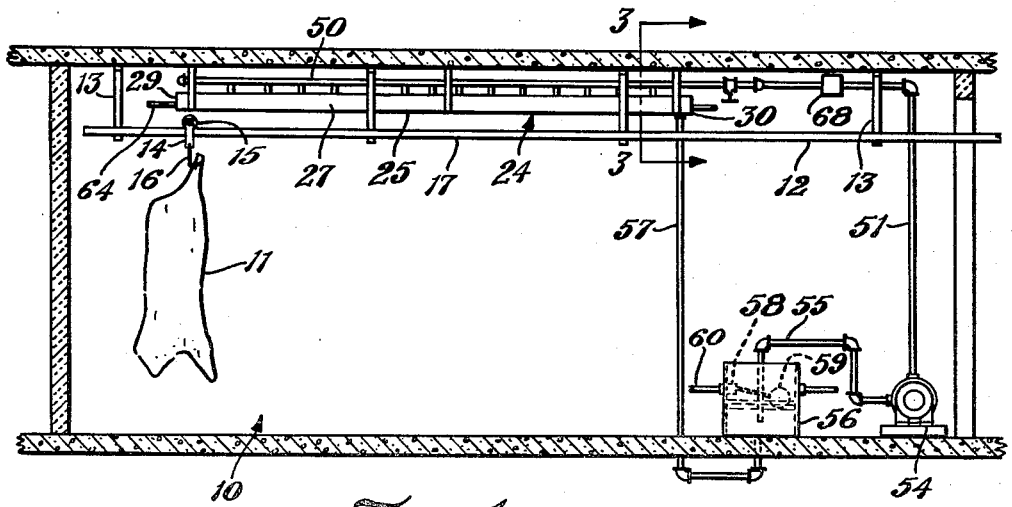
Figure 1 is an elevational section through a cooling chamber and showing an embodiment of the invention inserted therein.
Figure 3:
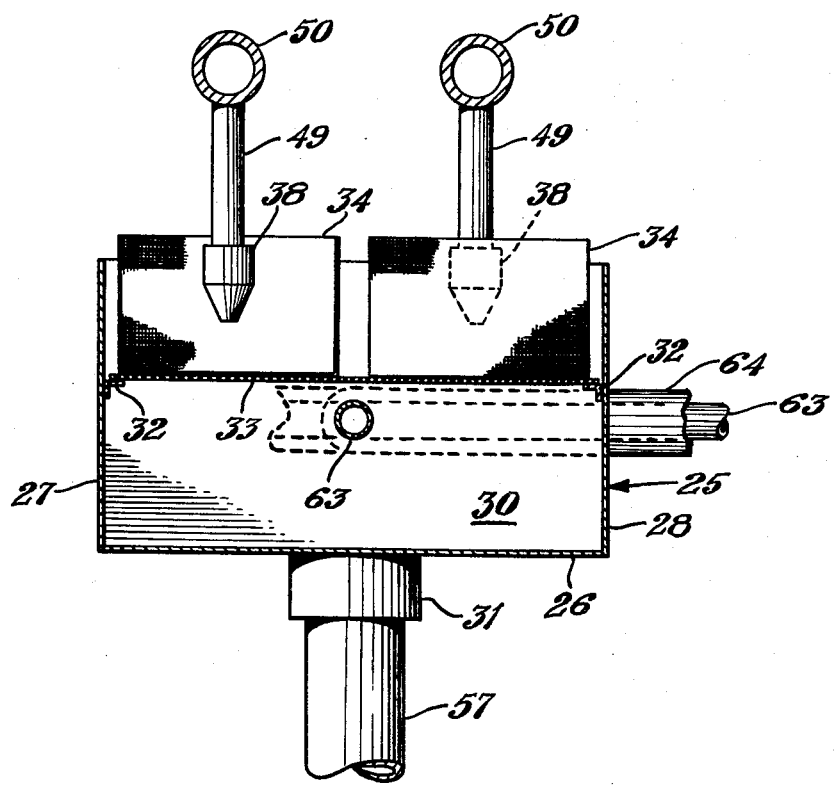
Figure 3 is an enlarged section taken at line 3—3 of Figure 1.

Referring to Figures 1 and 2, there is illustrated a room generally 10 which is refrigerated by suitable apparatus not shown and used to chill or hold carcasses 11. The particular size, shape, etc., of the room is unimportant as far as the present invention is concerned. The temperature to which it is refrigerated will vary from meat packer to meat packer. Often such chambers used in removing the body heat of carcasses are refrigerated to a temperature of about 28° F. Usually the refrigeration apparatus that is employed in connection with such a room includes means for circulating the air through the chamber.

An overhead rail 12 is suitably supported in the room as by means of brackets 13 connecting the rail with the ceiling of the room. Hangers 14 for moving the carcasses 11 into and out of the room have a wheel 15 which rides on rail 12 and a hook 16 on which the carcass 11 is hung. As will be seen in Figure 2, the rail 12 may have a plurality of spaced lines or sidetracks designated by the numbers 17, 18 and 19 so as to increase the number of carcasses that may be held in the room and to permit a flow of air about and between the various rows of carcasses.

The humidification apparatus of my invention may conveniently be mounted between these side tracks 17, 18 and 19 adjacent the ceiling of the room. In this way the humidification apparatus is occupying no otherwise usable space and it is in an ideal position for the fog or mist produced to drift down about the carcasses 11. In Figures 1 and 2 there are illustrated two identical humidification units generally 23 and 24. The number, of course, can be varied to suit the particular installation. A description of unit 24 will serve to identify the structure of both units. Unit 24 comprises a tray 25 which has a bottom 26, two side walls 27 and 28, and two end walls 29 and 30. The pan has a drain 31 in the bottom 26 thereof. Along the side walls 27 and 28 are secured angles 32 on which rest a perforated shelf 33. The exact size and shape of the perforations in this shelf are not particularly important. In the illustrated embodiment the shelf is formed of a sheet of expanded metal. Resting on shelf 33 are a plurality of open-topped baskets 34. In the illustrated embodiment these baskets are 3" square by 1½" high. They are formed of 60 mesh screen.

Figure 4:
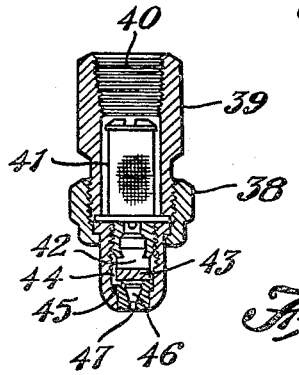
Figure 4 is an enlarged longitudinal section of the spray nozzle used in the embodiment.

Positioned within each of the baskets 34 is a spray nozzle 38. The nozzle is directed downwardly and the bottom of the nozzle is ½" from the bottom of basket 34. The structure of nozzles 38 is best illustrated in Figure 4. They comprise a body 39 having one end 40 threaded for attachment to a pipe. Within body 39 is a strainer 41 through which the liquid must pass to get to an internal chamber 42. In the other end of chamber 42 is a core plate 43 having a passageway 44. The passageway communicates with a partial circumferential opening 45 about the periphery of the outer chamber 46. On the face of core plate 43, which forms one end of chamber 46, are three slots at an angle to the radius of the core plate with the slots being positioned 120° apart. The combination of these slots and the curvilinear inlet opening 45 serve to give the water a whirling motion which results in the production of the conical spray pattern which is emitted from the 0.020" orifice 47 at the end of chamber 46.

Nozzles 38 are threaded onto a plurality of depending pipes 49 secured to and communicating with horizontal pipes 50. Each of horizontal pipes 50 connects with a header 51. Preferably a valve 52 is inserted in each of the horizontal pipes 50 adjacent header 51. This permits the shutting down of any one line without interfering with the operation of the remaining lines. Header 51 connects to the output side of a high pressure pump 53 driven by a motor 54. The exact structure of this pump 53 is not important. It may be a gear pump, vane pump, multipiston pump, etc. Preferably, however, it is capable of supplying sufficient water to feed the spray heads at a pressure of approximately 1000 pounds per square inch. The intake side of the pump 53 is connected by a pipe 55 to a water make-up tank 56. A pipe 57 from drain 31 communicates with make-up tank 56 and supplies a substantial portion of the water thereto. However, to replace the water that is atomized, as hereinafter described, additional water is supplied to the make-up tank 56 from a pipe 60 connected to a suitable source of water supply. Within tank 56 in the end of pipe 60 is a valve 58 operated by a float 59. The valve is adjusted to maintain substantially a constant water level in tank 56. As the water level drops the lowered position of the float opens the valve and conversely as the float rises with additional water the valve is moved towards the closed position.

In order to avoid any trouble with ice when the system is operated in a chamber held at a temperature much below freezing, a small steam line is run through each of the trays 25 to provide a small amount of heat. As will be seen the steam line consists of a small tubing 63 which passes through the length of the tray 25 with the two ends being connected outside room 10 to a suitable source of steam. Outside of trays 25 tubing 63 will be provided with insulation 64 to avoid unnecessary losses.

As previously mentioned, in operation water is supplied to nozzles 38 at a pressure of approximately 1000 pounds per square inch. In some embodiments it may be desirable to include a pressure regulating valve such as that shown in pipe 51 at 68. The water which comes from nozzles 38 will be at a very high velocity and as previously mentioned in a conical spray pattern. This water will create a very substantial air movement in the same direction as the movement of the water in the spray pattern. The air however will be trapped by tray 25 and its path reversed back upwardly by the bottom of screen basket 34 in substantially the reverse of the movement of the water in the spray. The reverse air movement will pick up the extremely fine particles of water and carry them out of tray 25 as a fine mist. The heavier particles will pass on beyond shelf 33 into the lower portion of tray 25 where they will be trapped, accumulated, and drain off through drain 31 and pipe 57. The particles of water that make up the mist of the described embodiment will be of a size of 10 microns or less. Only approximately 3–5% of the water that is emitted from spray heads 38 will be of this extremely small particle size and will be sufficiently small to be carried off by the air movement described. The remainder of the water, 95–97%, will drain back into tank 56 where the 3–5% will be made up by the water coming from pipe 60. The water in tank 56 is then recirculated through the spray heads 38 by pump 53.

For producing other embodiments the important thing to be followed is in the positioning of the bottom of the mesh making up basket number 34. This mesh or divider should be positioned at a point such that the velocity of the air that is moving in the reverse direction of the spray is equal to the velocity of the largest particles, which it is desired to pick up in the fog. For example, where the largest particle size is preferably about 10 microns, as in the case of the fog of my invention for meat coolers, the velocity of the air at the point of the bottom of the basket should be approximately equal tc and in the reverse direction of the velocity of the 10 micron water particles. All of the water discharged from the nozzle will leave the nozzle at the same velocity but thereafter the velocity of those drops will decrease in inverse proportion to the size of these drops. Another way of stating this is that the larger the drops, the higher the velocity at any particular distance from the spray nozzle. Thus, by placing the screen at a definite distance from the nozzle, a very sharp classification of the drop sizes can be effected.

I have found that using fogs or mists made up of water particles of 10 microns or less, the deposit of water on surfaces in the cooler is kept at a minimum. This reduces rusting and freezing problems. Furthermore, such a mist does an excellent job of holding down the shrink of the meat.

The foregoing description is for the purpose of complying with 35 U.S.C. 112 and should not be assumed to impose limitations on the appended claims not specifically set forth therein inasmuch as variations in the method and apparatus will be apparent to those skilled in the art from the foregoing description. Such variations might includes the positioning of make-up tank 56, pump 53 and motor 54 outside of chamber 10. Obviously these elements could be put at any convenient spot in the building and the water run to the humidifiers through a length of pipe 51. The water velocity and/or distance between the end of the nozzle 38 and the position of the screen through which the water passes, as defined by the bottom of basket 34 in the disclosed embodiment, can be varied as previously described. The specific structure of nozzles 38 is not of great importance, although it is desirable to use nozzles having a conical spray pattern. While the embodiment illustrated operates with the nozzles directed vertically downward (and this is the preferable position), it would be possible to construct embodiments incorporating the foregoing teachings of my invention with the nozzles directed in another direction.

In the described embodiment the 60 mesh screen was formed into baskets 34. While this is the preferred embodiment, it is not necessary to practice the invention to have this screen have sides so as to form baskets. A flat sheet of screen positioned in front of the nozzle 38 will perform the necessary function of classifying the size of drops and deflecting the airstream although it may be found that there is more splashing than with the described embodiment. Furthermore, the mesh of this screen may be varied although satisfactory results may be lost if a larger opening screen than 50 mesh or if a smaller opening screen than 150 mesh is used. In the described embodiment the water flow is employed to develop the reverse air flow, but it will be apparent that blowers could be employed for such a purpose.

I claim:

A device for producing a spray, fog or mist composed of fluid droplets not substantially in excess of 10 microns in diameter said device comprising: a drain tray having a bottom and upstanding sidewalls for receiving fluid; a nozzle connected to a high-pressure water supply of about 1,000 lbs. pressure for projecting a spray at least partially composed of fluid droplets of 10 microns in diameter or less into said tray, said nozzle being capable of generating a substantial air stream directed downwardly with said spray toward the bottom of said tray; and a fine mesh screen positioned within said tray between said nozzle and said bottom substantially transverse to the projected spray and capable of substantially reversing the direction of a portion of said air stream, said screen being positioned at a distance of about one-half inch below said nozzle whereby the reversed air stream passes through at least a portion of said spray with sufficient force to selectively support and carry away from the bulk of said spray, before reaching said screen, a substantial portion of the fluid droplets having a diameter of 10 microns and less while permitting the droplets having a diameter in excess of 10 microns to agglomerate on said screen and pass into said drain tray.

References Cited in the file of this patent

UNITED STATES PATENTS

| | | |
|---|---|---|
| 1,491,443 | Toombs | Apr. 22, 1924 |
| 1,828,877 | Scott | Oct. 27, 1931 |
| 1,958,805 | Sieloff | May 15, 1934 |
| 2,032,404 | Fisher | Mar. 3, 1936 |
| 2,065,358 | Zarotschenzeff | Dec. 22, 1936 |
| 2,088,962 | Kleucker | Aug. 3, 1937 |
| 2,196,644 | Rubel | Apr. 9, 1940 |
| 2,419,119 | Christensen | Apr. 15, 1947 |
| 2,645,292 | Williams | July 14, 1953 |
| 2,705,678 | Morrison | Apr. 5, 1955 |